United States Patent
Maruyama et al.

(10) Patent No.: US 8,362,107 B2
(45) Date of Patent: Jan. 29, 2013

(54) INK SET AND RECORDING METHOD USING THE SAME

(75) Inventors: Chie Maruyama, Matsumoto (JP); Miharu Kanaya, Azumino (JP); Daisuke Ishihara, Shiojiri (JP); Ayako Nishiki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 70 days.

(21) Appl. No.: 13/038,632

(22) Filed: Mar. 2, 2011

(65) Prior Publication Data

US 2011/0217468 A1 Sep. 8, 2011

(30) Foreign Application Priority Data

Mar. 2, 2010 (JP) ................................. 2010-045321
Mar. 2, 2010 (JP) ................................. 2010-045339

(51) Int. Cl.
*C09D 11/10* (2006.01)

(52) U.S. Cl. ........................................ 523/160; 427/256
(58) Field of Classification Search .................. 523/160
See application file for complete search history.

(56) References Cited

U.S. PATENT DOCUMENTS

| 5,609,671 | A | 3/1997 | Nagasawa | |
|---|---|---|---|---|
| 6,123,759 | A | 9/2000 | Mise et al. | |
| 6,740,152 | B1 | 5/2004 | Fukuda | |
| 2007/0037901 | A1* | 2/2007 | Kanaya et al. | 523/160 |
| 2009/0196995 | A1* | 8/2009 | Saito et al. | 427/256 |
| 2009/0258146 | A1 | 10/2009 | Saito et al. | |
| 2009/0258147 | A1 | 10/2009 | Saito et al. | |

FOREIGN PATENT DOCUMENTS

| JP | 8-3498 A | 1/1996 |
|---|---|---|
| JP | 10-237349 A | 9/1998 |
| JP | 2001-81366 A | 3/2001 |
| JP | 2002-80761 A | 3/2002 |
| JP | 2002-121434 A | 4/2002 |
| JP | 2007-51176 A | 3/2007 |
| JP | 2009-256605 A | 11/2009 |
| JP | 2009-256606 A | 11/2009 |
| WO | 0194476 A2 | 12/2001 |

* cited by examiner

*Primary Examiner* — Vu A Nguyen
(74) *Attorney, Agent, or Firm* — Nutter McClennen & Fish LLP; John J. Penny, Jr.; Christina M. Sperry

(57) ABSTRACT

An ink set includes at least a cyan ink composition containing a self-dispersible pigment, a magenta ink composition containing a self-dispersible pigment, and a yellow ink composition containing a pigment coated with a water-insoluble polymer.

8 Claims, No Drawings

INK SET AND RECORDING METHOD USING THE SAME

BACKGROUND

1. Technical Field

The present invention relates to ink sets including at least cyan, magenta, and yellow ink compositions and ink-jet recording methods for ejecting ink compositions onto recording media to perform printing.

2. Related Art

Ink-jet recording is a printing method of ejecting ink droplets onto recording media, such as paper, to perform printing. Inks are typically prepared by dissolving various water-soluble dyes in water or water and a water-soluble organic solvent. It is generally pointed out that an image formed using an ink containing a water-soluble dye has low water resistance and light fastness.

In contrast, inks prepared by dispersing pigments in aqueous media have high water resistance and light fastness. For example, aqueous pigment inks prepared by dispersing pigments with surfactants or polymer dispersants have been proposed. These inks, however, may exhibit sharply increased viscosity as the colorant content is increased to increase the print density of a recorded material. In addition, excessive surfactant or polymer dispersant is needed to stably disperse the pigments in the inks. This may foam the inks and degrade the defoaming properties thereof, thus impairing the print stability.

To solve these problems, disclosed are self-dispersible pigment dispersions, which contain pigments having a certain amount or more of surface active hydrogen or salt thereof introduced to the surface thereof so that they can be dispersed in an aqueous solvent by themselves without the use of a dispersant such as a surfactant or a polymer dispersant.

According to JP-A-10-237349, JP-A-8-3498, and WO01/94476, an ink containing a pigment requiring no dispersant, namely, a self-dispersible pigment, as a colorant forms an image with a higher optical density (OD), is easy to handle because the viscosity thereof can be easily adjusted to an appropriate range, and eliminates the need for taking into account compatibility between dispersants and various additional solvents. The surface of the pigment has hydrophilic functional groups, such as carbonyl, carboxyl, hydroxyl, sulfo, or ammonium groups, attached thereto directly or indirectly with other functional groups, such as alkyl or aryl groups, therebetween.

As an ink set including inks containing self-dispersible pigments, for example, JP-A-2002-121434 discloses an aqueous color ink set for ink-jet recording including a black ink and, as color inks, at least cyan, magenta, and yellow inks. The black ink and the color inks contain pigments self-dispersible in water. This publication, however, does not disclose an ink set in which only the yellow ink composition contains a pigment coated with a water-insoluble polymer.

In addition, JP-A-2009-256605 discloses an ink set including a black ink composition containing a self-dispersible pigment having hydrophilic groups on the surface thereof and color ink compositions containing self-dispersible pigments having hydrophilic groups on the surface thereof with phenyl groups therebetween. This publication, however, does not disclose an ink set in which only the yellow ink composition contains a pigment coated with a water-insoluble polymer.

In addition, JP-A-2007-51176 discloses an ink set including a black ink composition containing a self-dispersible pigment and color ink compositions containing organic pigments coated with a water-insoluble polymer. This publication, however, does not disclose an ink set which includes at least cyan, magenta, and yellow ink compositions and in which only the yellow ink composition contains a pigment coated with a water-insoluble polymer.

However, self-dispersible pigments generally have a problem in that an image formed using an ink containing a self-dispersible pigment as a colorant has low fusibility. The image is smudged when rubbed with, for example, a finger, a marker, or paper; that is, the recorded material may have insufficient smear resistance. Similarly, an image formed using an ink containing a pigment coated with a water-insoluble polymer as a colorant may have insufficient fusibility and smear resistance, particularly if the ink composition has a high pigment concentration. To improve the fusibility of the pigments on recording media, the addition of a resin having a binder effect on recording media to the ink composition has been proposed.

JP-A-2001-81366 and 2002-80761 propose ink compositions containing resin particles, specifically, a recording liquid containing a colorant, fine resin particles, and water and an ink printer recording liquid containing an aqueous pigment dispersion and fine resin particles.

In addition, JP-A-2009-256606 discloses an ink set including a black ink composition containing a self-dispersible pigment having hydrophilic groups on the surface thereof and color ink compositions containing self-dispersible pigments having hydrophilic groups on the surface thereof with phenyl groups therebetween, each further containing a resin emulsion. This publication, however, does not disclose an ink set in which only the yellow ink composition contains a pigment coated with a water-insoluble polymer.

SUMMARY

The inventors have found that an ink set including at least a cyan ink composition containing a self-dispersible pigment, a magenta ink composition containing a self-dispersible pigment, and a yellow ink composition containing a pigment coated with a water-insoluble polymer has high color reproduction, high ejection stability, and high declogging performance and allows formation of an image having high color vividness on both plain paper and ink-jet paper, particularly in high-speed printing, with little cockling and curling.

The inventors have further found that an ink set including at least a cyan ink composition containing a self-dispersible pigment, a magenta ink composition containing a self-dispersible pigment, and a yellow ink composition containing a pigment coated with a water-insoluble polymer, each further containing a resin emulsion, has high color reproduction, high ejection stability, and high declogging performance and allows formation of an image having high color vividness on both plain paper and ink-jet paper, particularly in high-speed printing, with little cockling and curling and improved fusibility on plain paper and improved smear resistance on ink-jet paper. The invention is based on these findings.

Accordingly, an advantage of some aspects of the invention is that it provides an ink set that has high color reproduction, high ejection stability, and high declogging performance and that allows formation of an image having high color vividness on both plain paper and ink-jet paper, particularly in high-speed printing, with little cockling and curling. Another advantage is that it provides an ink set that allows formation of an image with improved fusibility on plain paper and improved smear resistance on ink-jet paper.

DESCRIPTION OF EXEMPLARY EMBODIMENTS

An ink set according to an embodiment of the invention includes at least a cyan ink composition containing a self-dispersible pigment, a magenta ink composition containing a self-dispersible pigment, and a yellow ink composition containing a pigment coated with a water-insoluble polymer.

In addition, an ink set according to another embodiment of the invention includes at least a cyan ink composition containing a self-dispersible pigment, a magenta ink composition containing a self-dispersible pigment, and a yellow ink composition containing a pigment coated with a water-insoluble polymer, each further containing a resin emulsion. The yellow ink composition, the ink compositions other than the yellow ink composition, and the resin emulsion that can be used for the ink sets according to the embodiments of the invention will now be described.

As used herein, the term "plain paper" refers to paper, such as PPC paper, produced without consideration of ink-jet recording properties. On the other hand, the term "ink-jet paper" refers to recording media for ink-jet recording having ink receptor layers on substrates such as fine paper, including both "swelling type," which has an ink receptor layer containing a water-soluble resin such as polyvinyl alcohol, and "absorption type," which has an ink receptor layer containing a porous material such as amorphous silica.

Yellow Ink Composition

The yellow ink composition that can be used in the embodiments of the invention contains a pigment coated with a water-insoluble polymer.

The water-insoluble polymer is a polymer prepared by solution polymerization using at least a polymerizable unsaturated monomer and a polymerization initiator. The term "water-insoluble polymer" refers to a polymer having a solubility of less than 1 g in 100 g of water at 25° C. after neutralization.

Examples of polymerization initiators include vinyl aromatic hydrocarbons, methacrylic acid esters, methacrylamide, alkyl-substituted methacrylamides, maleic anhydride, vinyl cyanides, methyl vinyl ketone, and vinyl acetate. Specific examples include styrene, α-methylstyrene, vinyltoluene, 4-t-butylstyrene, chlorostyrene, vinylanisole, vinylnaphthalene, methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, acrylonitrile, and methacrylonitrile, which can be used alone or as a mixture of two or more.

The water-insoluble polymer preferably further contains a monomer having a hydrophilic group and a monomer having a salt-forming group to impart a gloss to a printed image.

Examples of monomers having a hydrophilic group include polyethylene glycol monomethacrylate, polypropylene glycol monomethacrylate, and ethylene glycol-propylene glycol monomethacrylate, which can be used alone or as a mixture of two or more. In particular, a higher gloss can be imparted to a printed image using a monomer that forms a branched chain, such as polyethylene glycol (2 to 30) monomethacrylate, polyethylene glycol (1 to 15)-propylene glycol (1 to 15) monomethacrylate, polypropylene glycol (2 to 30) methacrylate, methoxy polyethylene glycol (2 to 30) methacrylate, methoxy polytetramethylene glycol (2 to 30) methacrylate, methoxy(ethylene glycol-propylene glycol copolymer) (1 to 30) methacrylate.

Examples of monomers having a salt-forming group include acrylic acid, methacrylic acid, styrenecarboxylic acid, and maleic acid, which can be used alone or as a mixture of two or more.

In addition, other monomers such as macromonomers having a polymerizable functional group at one terminal thereof, including styrene macromonomers and silicone macromonomers, can be used in combination.

For polymerization, a known radical initiator or chain transfer agent may be added as a polymerization initiator. Examples of polymerization initiators include 2,2'-azobisisobutyronitrile, 2,2'-azobis(2,4-dimethylvaleronitrile), 2,2'-azobis(2,3-dimethylbutyronitrile), 2,2'-azobis(2-methylbutyronitrile), 2,2'-azobis(2,3,3-trimethylbutyronitrile), 2,2'-azobis(2-isopropylbutyronitrile), 1,1'-azobis(cyclohexane-1-carbonitrile), 2,2'-azobis(4-methoxy-2,4-dimethylvaleronitrile), 2-(carbamoylazo)isobutyronitrile, 4,4'-azobis(4-cyanovaleric acid), and dimethyl-2,2'-azobisisobutyrate; peroxides such as butyl peroxide, propyl peroxide, butyryl peroxide, benzoylisobutyryl peroxide, and benzoyl peroxide; and water-soluble initiators such as potassium persulfate, ammonium persulfate, sodium persulfate, 2,2'-azobis(2-methylpropionamidine) dihydrochloride, and 4,4'-azobis(4-cyanovaleric acid). In addition, a redox initiator such as a combination of potassium persulfate, ammonium persulfate, or sodium persulfate and sodium sulfite, sodium hyposulfite, or ferrous sulfate can be used. The amount of polymerization initiator used is preferably 0.001 to 5 mol, more preferably 0.01 to 2 mol, per mole of monomer mixture. For polymerization, a known chain transfer agent such as a mercaptan, e.g., octylmercaptan or 2-mercaptoethanol, or a thiuram disulfide may also be added.

The organic pigment coated with the water-insoluble polymer is prepared by phase inversion emulsification. Specifically, the organic pigment coated with the water-insoluble polymer can be prepared as an aqueous dispersion by dissolving the water-insoluble polymer in an organic solvent such as methanol, ethanol, isopropanol, n-butanol, acetone, methyl ethyl ketone, or dibutyl ether, adding the organic pigment to the solution, preparing an oil-in-water dispersion by adding a neutralizer and water under kneading and dispersion treatment, and removing the organic solvent from the dispersion. The kneading and dispersion treatment can be performed using, for example, a ball mill, a roll mill, a bead mill, a high-pressure homogenizer, or a high-speed disperser.

The neutralizer is preferably ethylamine, a tertiary amine such as trimethylamine, lithium hydroxide, sodium hydroxide, potassium hydroxide, or ammonia. The pH of the aqueous dispersion is preferably 6 to 10.

In addition, the water-insoluble polymer for coating preferably has a weight average molecular weight of about 10,000 to 150,000 in view of stably dispersing the colorant, particularly the pigment. The weight average molecular weight can be measured by molecular weight analysis based on gel permeation chromatography (GPC).

The yellow ink composition used in the embodiments of the invention preferably contains water in an amount of 10% to 60% by mass of the ink composition, a water-soluble organic solvent, and a surfactant.

If the amount of water contained in the yellow ink composition falls within the above range, cellulose in coated paper absorbs less water from the ink composition than from a known ink composition and therefore suffers less swelling, which causes cockling and curling. Thus, such an ink composition is useful for recording media having absorbing layers of paper supports with poor ink absorption properties, including plain paper and coated paper for printing.

The pigment used for the pigment coated with the water-insoluble polymer in the yellow ink composition used in the embodiments of the invention is exemplified by yellow pigments listed in the Color Index (C.I.), azo pigments, and fused ring pigments. In addition, organic pigments such as Food Yellow Nos. 4, 5, 205, and 401 can be used. Specific examples include C.I. Pigment Yellow 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180, and 198. In particular, the yellow ink composition preferably contains at least one organic pigment selected from the group consisting of C.I. Pigment Yellow 74, 109, 110, 128, 138, 147, 150, 155, 180, and 188.

The amount of pigment coated with the water-insoluble polymer in the yellow ink composition is preferably 6% by mass or more. If the pigment concentration is 6% by mass or more, a recorded material with high color vividness can be produced.

The water contained in the yellow ink composition used in the embodiments of the invention, serving as a main solvent, is preferably pure or ultrapure water such as ion exchange water, ultrafiltrated water, reverse osmosis water, or distilled water. In particular, water sterilized by ultraviolet irradiation or addition of hydrogen peroxide, for example, is preferably used to inhibit growth of fungi and bacteria so that the ink composition can be preserved over an extended period of time.

Examples of the water-soluble organic compound used in the embodiments of the invention include polyalcohols such as glycerol, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; solid humectants including saccharides, such as glucose, mannose, fructose, ribose, xylose, arabinose, galactose, aldonic acid, glucitol (sorbit), maltose, cellobiose, lactose, sucrose, trehalose, and maltotriose, as well as sugar alcohols, hyaluronic acids, and ureas; alkyl alcohols having one to four carbon atoms, such as methanol, ethanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol monoisopropyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol monoisopropyl ether, dipropylene glycol monomethyl ether, dipropylene glycol monoethyl ether, dipropylene glycol mono-n-propyl ether, and dipropylene glycol monoisopropyl ether; and other compounds such as 2-pyrrolidone, N-methyl-2-pyrrolidone, 1,3-dimethyl-2-imidazolidinone, formamide, acetoamide, dimethyl sulfoxide, sorbit, sorbitan, acetin, diacetin, triacetin, and sulfolane, which can be used alone or in a combination of two or more. The water-soluble organic solvent is preferably contained in an amount of 10% to 90% by mass of the yellow ink composition in view of ensuring that the yellow ink composition has appropriate physical properties (such as viscosity) and sufficient print quality and reliability. The yellow ink composition used in the embodiments of the invention, containing the water-soluble organic solvent, has high storage stability and ejection stability even if the solid content is high.

In the embodiments of the invention, additionally, a combination of at least a polyalcohol, a butyl ether of a glycol, and a pyrrolidone is preferably used as the water-soluble organic solvent because it provides a yellow ink composition having high reliability, including high print quality, ejection stability, and declogging performance. A polyalcohol is suitable for controlling the water retention properties (moisture retention properties) and the permeability of the yellow ink composition into recording media such as plain paper. A butyl ether of a glycol is suitable for controlling the ejection stability and the permeability of the ink composition into recording media. A pyrrolidone contributes greatly to the ejection stability and the storage stability and color vividness of the ink composition. Thus, a combination of a polyalcohol, a butyl ether of a glycol, and a pyrrolidone provides a yellow ink composition having high reliability, including high print quality, ejection stability, and declogging performance.

In the embodiments of the invention, additionally, as the water-soluble organic solvent, the yellow ink composition preferably contains a polyalcohol monoalkyl ether and/or a nitrogen-containing cyclic compound in an amount of 5% by mass or more and a polyalcohol. The use of such a water-soluble organic solvent inhibits cockling and curling and ensures sufficient print quality without bleeding or unevenness.

Examples of polyalcohol monoalkyl ethers among the above glycol ethers include diethylene glycol monoethyl ether, diethylene glycol monobutyl ether, diethylene glycol monoisobutyl ether, dipropylene glycol monomethyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether. Examples of nitrogen-containing cyclic compounds include 1,3-dimethyl-2-imidazolidinone, 2-pyrrolidone, N-methyl-2-pyrrolidone, and ε-caprolactam.

In addition, although any of the above polyalcohols can be used, a 1,2-alkanediol such as 1,2-pentanediol, 1,2-hexanediol, or 1,2-octanediol is preferred.

The surfactant contained in the yellow ink composition used in the embodiments of the invention may be an anionic surfactant, a cationic surfactant, an amphoteric surfactant, or a nonionic surfactant. In particular, a nonionic surfactant is preferred in view of yielding an ink composition having a low tendency to foam.

Examples of nonionic surfactants include acetylene glycol surfactants; acetylene alcohol surfactants; ether surfactants such as polyoxyethylene nonyl phenyl ether, polyoxyethylene octyl phenyl ether, polyoxyethylene dodecyl phenyl ether, polyoxyethylene alkyl aryl ether, polyoxyethylene oleyl ether, polyoxyethylene lauryl ether, polyoxyethylene alkyl ether, and polyoxyalkylene alkyl ether; ester surfactants such as polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; polyether-modified siloxane surfactants such as dimethyl polysiloxane; and fluorine-containing surfactants such as fluoroalkyl esters and perfluoroalkyl carboxylate salts. These nonionic surfactants can be used alone or in a combination of two or more.

In the embodiments of the invention, of the above nonionic surfactants, the yellow ink composition preferably contains an acetylene glycol surfactant and/or a polyether-modified siloxane surfactant so that it has a low tendency to foam and high defoaming performance.

Examples of acetylene glycol surfactants include 2,4,7,9-tetramethyl-5-decyne-4,7-diol, 3,6-dimethyl-4-octyne-3,6-diol, and 3,5-dimethyl-1-hexyn-3-ol. Commercial products are also available, including Surfynol 104, 82, 465, 485, and TG available from Air Products and Chemicals, Inc. and Olfine STG and E1010 available from Nissin Chemical Industry Co., Ltd. Examples of polyether-modified siloxane surfactants include BYK-345, BYK-346, BYK-347, BYK-348, and UV3530 from BYK-Chemie Japan K.K. The ink composition may contain a plurality of surfactants. Preferably, the surface tension is adjusted to 20 to 40 mN/m, and the surfactant is contained in the yellow ink composition in an amount of 0.1% to 3.0% by mass.

The yellow ink composition used in the embodiments of the invention preferably contains a pH adjustor. The pH adjustor used may be, for example, an alkali hydroxide such as lithium hydroxide, potassium hydroxide, or sodium hydroxide and/or ammonia or an alkanolamine such as triethanolamine, tripropanolamine, diethanolamine, or monoethanolamine. In particular, the ink composition preferably contains at least one pH adjustor selected from the group consisting of hydroxides of alkali metals, ammonia, triethanolamine, and tripropanolamine so that the pH thereof is adjusted to 6 to 10. A pH outside this range adversely affects the constituent materials of ink-jet printers and degrades the declogging performance.

In addition, a pH buffer such as collidine, imidazole, phosphoric acid, 3-(N-morpholino)propanesulfonic acid, tris(hydroxymethyl)aminomethane, or boric acid may be optionally added.

In addition, the yellow ink composition used in the embodiments of the invention may optionally contain additives such as a defoamer, an antioxidant, an ultraviolet absorber, and a preservative or fungicide.

Examples of antioxidants and ultraviolet absorbers include allophanates such as allophanate and methyl allophanate; biurets such as biuret, dimethyl biuret, and tetramethyl biuret; L-ascorbic acid and salts thereof; Tinuvin 328, 900, 1130, 384, 292, 123, 144, 622, 770, and 292, Irgacor 252 and 153, and Irganox 1010, 1076, 1035, and MD1024 available from Ciba-Geigy Ltd.; and lanthanide oxides.

Examples of preservatives and fungicides include sodium benzoate, sodium pentachlorophenol, sodium-2-pyridinethiol-1-oxide, sodium sorbate, sodium dehydroacetate, and 1,2-benzothiazolin-3-on (e.g., Proxel CRL, BDN, GXL, XL-2, and TN available from Avecia Ltd.).

Ink Compositions Other than Yellow Ink Composition

The ink sets according to the embodiments of the invention include at least a cyan ink composition and a magenta ink composition, and these ink compositions other than the yellow ink composition contain self-dispersible pigments. The ink sets according to the embodiments of the invention preferably further include a black ink composition containing a self-dispersible pigment as an ink composition other than the yellow ink composition.

The term "self-dispersible pigment" refers to a pigment that can be dispersed and/or dissolved in an aqueous medium without a dispersant. The phrase "dispersed and/or dissolved in an aqueous medium without a dispersant" means that the pigment is stabilized in an aqueous medium by hydrophilic groups on the surface thereof without using a dispersant for dispersing the pigment.

An ink containing a self-dispersible pigment as a colorant does not require a dispersant used for dispersing a normal pigment. Accordingly, an ink having high ejection stability can be easily prepared without foaming due to a deterioration in defoaming properties resulting from the use of a dispersant. In addition, the ink can contain more pigment without a substantial increase in viscosity resulting from the use of a dispersant to ensure sufficiently high print density. Thus, the ink is easy to handle.

The ink compositions other than the yellow ink composition used in the embodiments of the invention contain self-dispersible pigments having hydrophilic groups on the surface thereof. The hydrophilic groups are preferably of one or more types selected from the group consisting of —OM, —COOM, —CO—, —$SO_3M$, —$SO_2M$, —$SO_2NH_2$, —$RSO_2M$, —$PO_3HM$, —$PO_3M_2$, —$SO_2NHCOR$, —$NH_3$, and —$NR_3$ (where M is hydrogen, an alkali metal, ammonium, an optionally substituted phenyl group, or an organic ammonium; and R is an alkyl group having 1 to 12 carbon atoms or an optionally substituted naphthyl group).

The self-dispersible pigments for the ink compositions other than the yellow ink composition are produced by, for example, physically or chemically treating a pigment so that hydrophilic groups are attached (grafted) to the surface thereof. The physical treatment is exemplified by vacuum plasma treatment. The chemical treatment, on the other hand, is exemplified by oxidizing a pigment in water using an oxidant, namely, wet oxidation, and attaching p-aminobenzoic acid to the surface of a pigment so that carboxyl groups are attached to the surface with phenyl groups therebetween.

In the embodiments of the invention, the color ink compositions other than the yellow ink composition preferably contain self-dispersible pigments having hydrophilic groups attached to the surface thereof with phenyl groups therebetween because they provide high color vividness. Hydrophilic groups may be attached to the surface of a pigment with phenyl groups therebetween by any known surface treatment, for example, by treating the surface of the pigment with sulfanilic acid, p-aminobenzoic acid, or p-aminosalicylic acid. On the other hand, if the ink sets according to the embodiments of the invention include a black ink composition, the black ink composition preferably contains a self-dispersible pigment treated by oxidation treatment with a hypohalous acid and/or a hypohalite salt, oxidation treatment with ozone, or oxidation treatment with persulfuric acid and/or a persulfate salt because it provides high color vividness.

The pigments used for the self-dispersible pigments in the color ink compositions other than the yellow ink composition are exemplified by red, violet, and blue pigments listed in the Color Index, phthalocyanine pigments, azo pigments, anthraquinone pigments, azomethine pigments, and fused ring pigments. In addition, organic pigments such as Food Orange Nos. 228 and 405 and Food Blue Nos. 1 and 404 and inorganic pigments such as titanium oxide, zinc oxide, zirconium oxide, iron oxide, Ultramarine Blue, Prussian Blue, and chromium oxide can be used. Specific examples include C.I. Pigment Red 1, 3, 5, 8, 9, 16, 17, 19, 22, 38, 57:1, 90, 112, 122, 123, 127, 146, and 184; C.I. Pigment Violet 1, 3, 5:1, 16, 19, 23, and 38; and C.I. Pigment Blue 1, 2, 15, 15:1, 15:2, 15:3, 15:4, and 16. The ink sets according to the embodiments of the invention include a cyan ink composition and a magenta ink composition as essential ink compositions. In particular, the magenta ink composition preferably contains at least one organic pigment selected from the group consisting of C.I. Pigment Red 122, 202, 207, and 209 and C.I. Pigment Violet 19, whereas the cyan ink composition preferably contains at least one organic pigment selected from the group consisting of C.I. Pigment Blue 15, 15:1, 15:2, 15:3, 15:4, and 16.

If the ink sets according to the embodiments of the invention include a black ink composition, the pigment used for the self-dispersible pigment in the black ink composition may be carbon black produced by a known process such as the contact process, the furnace process, or the thermal process. Examples of carbon black preferred in the embodiments of the invention include No. 2300, No, 900, MCF88, No. 20B, No. 33, No. 40, No. 45, No. 52, MA7, MA8, MA100, and No.

2200B (all available from Mitsubishi Chemical Corporation), Color Black FW1, FW2, FW2V, FW18, FW200, S150, S160, and S170, Printex 35, U, V, and 140U, and Special Black 6, 5, 4A, 4, and 250 (all available from Degussa AG); Conductex SC and Raven 1255, 5750, 5250, 5000, 3500, 1255, and 700 (all available from Columbian Chemicals Company); REGAL 400R, 330R, and 660R, MOGUL L, MONARCH 700, 800, 880, 900, 1000, 1100, 1300, and 1400, and ELFTEX 12 (all available from Cabot Corporation), which may be used alone or as a mixture of two or more.

As the self-dispersible pigments for the ink compositions other than the yellow ink composition, commercial products are also available, including MICROJET CW1 (available from Orient Chemical Industries Co., Ltd.) and CAB-O-JET250C and CAB-O-JET260M (available from Cabot Corporation).

The amount of self-dispersible pigment contained in the ink compositions other than the yellow ink composition is preferably 6% by mass or more. If the pigment concentration of the ink compositions other than the yellow ink composition is 6% by mass or more, a recorded material with high color vividness can be produced.

In addition, the self-dispersible pigments preferably have a mean particle size of 50 to 250 nm in view of, for example, ensuring sufficient ink storage stability and preventing nozzle clogging.

In addition, each of the ink compositions other than the yellow ink composition used in the embodiments of the invention preferably contains at least water in an amount of 10% to 60% by mass of the ink composition, a water-soluble organic solvent, and a surfactant, as does the yellow ink composition. The types and contents of these components are similar to those of the yellow ink composition.

In addition, the ink compositions other than the yellow ink composition used in the embodiments of the invention may optionally contain additives such as a pH adjustor, a pH buffer, a defoamer, an antioxidant, an ultraviolet absorber, and a preservative or fungicide, as does the yellow ink composition. The types of these components are similar to those of the yellow ink composition.

Resin Emulsion

The resin emulsion improves the fusibility of an image on a recorded material because the resin particles fuse with each other and with the colorant to fix the colorant to the recording medium as the ink dries.

The resin particles are preferably formed of one or more resins selected from the group consisting of acrylic resins, methacrylic resins, styrene resins, urethane resins, acrylamide resins, and epoxy resins. These resins may be used either as a homopolymer or as a copolymer.

The resin particles used in the other embodiment may have a single-particle structure. Alternatively, the resin particles used in the other embodiment may have a core-shell structure including a core and a shell surrounding the core. As used herein, the term "core-shell structure" refers to a particle in which two or more polymers of different compositions are separated into phases. Accordingly, this term encompasses not only a core completely coated with a shell, but also a core partially coated with a shell. In addition, the core-shell structure may be a core particle having a domain, for example, formed by part of the shell polymer. Furthermore, the core-shell structure may be a multilayer structure including three or more layers, that is, one or more additional layers of different compositions between the core and the shell.

The resin particles used in the other embodiment can be prepared by a known method of emulsification polymerization. Specifically, the resin particles can be prepared by emulsification polymerization of an unsaturated vinyl monomer in water in the presence of a polymerization catalyst and an emulsifier.

Examples of unsaturated vinyl monomers include those typically used for emulsification polymerization, such as acrylic acid ester monomers, methacrylic acid ester monomers, aromatic vinyl monomers, vinyl ester monomers, vinyl cyanide monomers, halogenated monomers, olefin monomers, and diene monomers.

Specific examples include acrylic acid esters such as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate; methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate; vinyl esters such as vinyl acetate; vinyl cyanides such as acrylonitrile and methacrylonitrile; halogenated monomers such as vinylidene chloride and vinyl chloride; aromatic vinyl monomers such as styrene, α-methylstyrene, vinyltoluene, t-butylstyrene, chlorostyrene, vinylanisole, and vinylnaphthalene; olefins such as ethylene and propylene; dienes such as butadiene and chloroprene; vinyl monomers such as vinyl ether, vinyl ketone, and vinyl pyrrolidone; unsaturated carboxylic acids such as acrylic acid, methacrylic acid, itaconic acid, fumaric acid, and maleic acid; acrylamides such as acrylamide and N,N'-dimethylacrylamide; and hydroxyl-containing monomers such as 2-hydroxyethyl acrylate, 2-hydroxypropyl acrylate, 2-hydroxyethyl methacrylate, and 2-hydroxypropyl methacrylate.

In the other embodiment, additionally, molecules derived from the above monomers and crosslinked with a crosslinking monomer having two or more polymerizable double bonds can be used. Examples of crosslinking monomers having two or more polymerizable double bonds include diacrylates such as polyethylene glycol diacrylate, triethylene glycol diacrylate, 1,3-butylene glycol diacrylate, 1,6-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, and 2,2'-bis(4-acryloxydiethoxyphenyl)propane; triacrylates such as trimethylolpropane triacrylate, trimethylolethane triacrylate, and tetramethylolmethane triacrylate; tetraacrylates such as ditrimethylol tetraacrylate, tetramethylolmethane tetraacrylate, and pentaerythritol tetraacrylate; hexaacrylates such as dipentaerythritol hexaacrylate; dimethacrylates such as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxyphenyl)propane; trimethacrylates such as trimethylolpropane trimethacrylate and trimethylolethane trimethacrylate; methylene bisacrylamide; and divinylbenzene, which can be used alone or as a mixture of two or more.

In addition, a polymerization initiator, an emulsifier, and a molecular weight regulator can be used in a usual manner for emulsification polymerization.

Examples of polymerization initiators include those used for usual radical polymerization, such as potassium persulfate, ammonium persulfate, hydrogen peroxide, azobisisobutyronitrile, benzoyl peroxide, dibutyl peroxide, peracetic acid, cumene hydroperoxide, t-butyl hydroxyperoxide, and p-menthane hydroxyperoxide. In particular, a water-soluble polymerization initiator is preferred if, as described above, the polymerization reaction is performed in water.

Examples of emulsifiers include sodium lauryl sulfate, compounds typically used as an anionic surfactant, a nonionic surfactant, or an amphoteric surfactant, and mixtures thereof, which can be used alone or as a mixture of two or more.

If the resin particles are produced by emulsification polymerization, particularly if a polymer emulsion of anionic resin particles is produced by emulsification polymerization, negatively charged groups on the surfaces of the resin particles, such as carboxyl or sulfonic acid groups, shift the pH thereof to the acid side, thus increasing the viscosity and promoting aggregation. Therefore, the emulsion is usually neutralized with a basic substance. Examples of basic substances include ammonia, organic amines, and inorganic hydroxides. Among others, monovalent inorganic hydroxides (such as potassium hydroxide, sodium hydroxide, and lithium hydroxide) are preferred in view of the long-term storage stability and ejection stability of the polymer emulsion and therefore the aqueous ink compositions. The amount of neutralizer added is appropriately determined so that the polymer emulsion has a pH of 7.5 to 9.5, preferably 7.5 to 8.5.

The resin particles used in the other embodiment preferably have a particle size of 5 to 400 nm, more preferably 50 to 200 nm, in view of the long-term storage stability and ejection stability of the ink compositions.

In addition, although the amount of resin emulsion added may be appropriately determined taking into account, for example, fusibility, the solid content of the resin emulsion in each ink composition is preferably 2% by mass or more.

Ink Set

The ink sets according to the embodiments of the invention can be configured in the same manner as known ink sets and can be used as ink sets for various known recording methods. In particular, the ink sets according to the embodiments of the invention are suitable for ink-jet recording, in which ink droplets are ejected onto recording media, such as paper, to perform printing, because a high-resolution, high-quality image can be printed at high speed using a relatively inexpensive apparatus.

Ink-Jet Recording Method

In an ink-jet recording method using the ink sets according to the embodiments of the invention, droplets of the ink compositions are ejected onto a heated recording medium to perform printing. Examples of methods for ejecting droplets of the ink compositions include a method of recording characters and symbols on a surface of a recording medium by converting electrical signals into mechanical signals using electrostrictive devices so that inks stored in nozzle heads are intermittently ejected and a method of recording characters and symbols on a surface of a recording medium by rapidly heating inks stored in nozzle heads to form bubbles in close proximity to ejection positions so that the inks are intermittently ejected by volume expansion of the bubbles. The ink sets according to the embodiments of the invention are preferably applied to an ink-jet recording method using electrostrictive devices. Preferably, droplets of the ink compositions are ejected by a recording head for ejecting ink droplets by the mechanical action of piezoelectric devices.

According to the embodiments of the invention, particularly in printing on ink-jet paper, droplets of the yellow ink composition used in the embodiments of the invention can be ejected onto a recording medium to record an image of any color. The image thus recorded has improved glossiness and color vividness on ink-jet paper.

An image recorded on a recording medium using the ink sets according to the embodiments of the invention has high color vividness on both plain paper and ink-jet paper, particularly in high-speed printing, with little cockling and curling.

Various recording media can be used, including ink-jet paper (such as matte paper and glossy paper), plain paper, coated paper for printing, and films.

EXAMPLE A

The invention will now be described in greater detail in the following examples, although the invention is not limited thereto.

Pigment Coated with Water-Insoluble Polymer
Preparation of Yellow Pigment Dispersion 1

A colorant dispersion of colorant particles coated with a water-insoluble polymer was prepared by the following method.

Synthesis of Water-Insoluble Polymer

A polymer solution was prepared by placing 20 parts by mass of organic solvent (methyl ethyl ketone), 0.03 part by mass of a chain transfer agent (2-mercaptoethanol), a polymerization initiator, and the monomers shown in Table 1 in a reaction vessel sufficiently purged with nitrogen gas, facilitating polymerization with stirring at 75° C., adding 0.9 part by mass of 2,2'-azobis(2,4-dimethylvaleronitrile) dissolved in 40 parts by mass of methyl ethyl ketone per 100 parts by mass of the monomer components, and allowing the solution to mature at 80° C. for one hour. The values shown in Table 1 indicate the proportions (%) of the monomers with respect to the total amount of monomer mixture (100%).

TABLE 1

| Monomer mixture composition | Water-insoluble polymer (% by mass) |
|---|---|
| Polypropylene glycol monomethacrylate (PO = 9) | 15 |
| Poly(ethylene glycol-propylene glycol) monomethacrylate (EO = 5, PO = 7) | 15 |
| Methacrylic acid | 12 |
| Styrene monomer | 40 |
| Styrene macromer | 15 |
| Benzyl methacrylate | 10 |

EO = ethylene oxide
PO = propylene oxide

Preparation of Pigment Dispersion

Dissolved in 45 parts by mass of methyl ethyl ketone was 7.5 parts by mass of the water-insoluble polymer in Table 1, and a predetermined amount of 20% aqueous sodium hydroxide solution (neutralizer) was added to neutralize salt-forming groups. The mixture was kneaded with 20 parts by mass of C.I. Pigment Yellow 74 in a bead mill for two hours. After the kneaded mixture was stirred in 120 parts by mass of ion exchange water, methyl ethyl ketone was removed under a reduced pressure at 60° C., and some water was also removed. Thus, a yellow pigment dispersion 1 having a solid content of 20% by mass was prepared.

Self-Dispersible Pigments

Preparation of Cyan Pigment Dispersion

A 4 L stainless steel beaker was attached to a rotor-stator high-shear mixer (Silverson L4RT-A) and was immersed in an ice bath. About 75 g of C.I. Pigment Blue 15:4 and 1,000 g of water were put into the beaker and were homogenized at 7,200 rpm for 15 minutes. The mixture was further stirred in 20 mL of an isopropanol solution containing 2.07 g (0.01 mol) of o-acetoanisidide for 15 minutes.

In another vessel, 4.35 g (0.025 mol) of sulfanilic acid, 30 mL of 1N HCl, and 1.73 g (0.025 mol) of sodium nitrite were mixed at 5° C. to 10° C. to form a diazonium salt. The diazonium salt was then added to the mixture of C.I. Pigment Blue 15:4 and o-acetoanisidide with stirring, and the temperature was maintained at about 10° C. The mixture was further stirred for two hours while checking the reaction on the basis of the presence or absence of the diazonium salt, where the pH was adjusted to 5 to 6 by dropwise addition of a 5 M sodium hydroxide solution. If the diazonium salt is present, a drop of the reaction mixture and a drop of a 1 M $Na_2CO_3$ solution containing 0.1% aminosalicylic acid spread and blend into orange on filter paper.

The mixture was transferred to a flow-through sonicator available from Telsonic AG and was sonicated for two hours. The resultant pigment dispersion was purified through a 50 nm diafiltration column and was concentrated to a solid content of 20%. Thus, a cyan pigment dispersion was prepared.

Preparation of Magenta Pigment Dispersion

A magenta pigment dispersion having a solid content of 20% by mass was prepared in the same manner as the cyan pigment dispersion except that C.I. Pigment Red 122 was used as the pigment instead of C.I. Pigment Blue 15:4.

Preparation of Yellow Pigment Dispersion 2

A yellow pigment dispersion 2 having a solid content of 20% by mass was prepared in the same manner as the cyan pigment dispersion except that C.I. Pigment Yellow 74 was used as the pigment instead of C.I. Pigment Blue 15:4.

Preparation of Black Pigment Dispersion

A mixture of 20 g of S170 (available from Degussa AG), a commercial product of carbon black, and 500 g of water was subjected to dispersion using a household mixer for five minutes. The resultant liquid was put into a 3 L glass vessel equipped with a stirrer and was stirred with the stirrer while introducing an ozone-containing gas having an ozone concentration of 8% by mass at 500 mL/m, where the ozone was generated using an electrolytic ozonizer available from Permelec Electrode Ltd. The resultant crude dispersion was filtered through the fiberglass filter paper GA-100 (available from Advantec Toyo Kaisha, Ltd.) and was concentrated to a solid content of 20% by mass while adding a 0.1 N potassium hydroxide to adjust the pH thereof to 9. Thus, a black pigment dispersion was prepared.

Preparation of Ink Compositions

Ink compositions were prepared by mixing the individual components according to the compositions in Table 2 below and filtering the mixtures through a 10 μm membrane filter. In Table 2 below, the values indicate the contents (% by mass) of the individual components in the inks. The resultant ink compositions were combined as in Table 3 below to configure ink sets 1 and 2.

TABLE 2

| | Cyan ink composition | Magenta ink composition | Yellow ink composition | | Black ink composition |
|---|---|---|---|---|---|
| | C | M | Y1 | Y2 | K |
| Cyan pigment dispersion (self-dispersible pigment; solid content: 20%) | 50 | | | | |
| Magenta pigment dispersion (self-dispersible pigment; solid content: 20%) | | 50 | | | |
| Yellow pigment dispersion 1 (pigment coated with water-insoluble polymer; solid content: 20%) | | | 50 | | |
| Yellow pigment dispersion 2 (self-dispersible pigment; solid content: 20%) | | | | 50 | |
| Black pigment dispersion (self-dispersible pigment; solid content: 20%) | | | | | 35 |
| Glycerol | 8 | 8 | 8 | 8 | 8 |
| Triethylene glycol | 5 | 5 | 5 | 5 | 5 |
| 1,2-Hexandiol | 5 | 5 | 5 | 5 | 5 |
| Trimethylolpropane | 3 | 3 | 3 | 3 | 3 |
| Triethylene glycol monobutyl ether | 15 | 15 | 15 | 15 | 20 |
| Olfine E1010 | 0.5 | 0.5 | 0.5 | 0.5 | 0.5 |
| Surfynol 104 | 0.5 | 0.5 | 0.5 | 0.5 | 0.5 |
| Triethanolamine | 1 | 1 | 1 | 1 | 1 |
| Water | Balance | Balance | Balance | Balance | Balance |
| Total | 100 | 100 | 100 | 100 | 100 |
| Amount of pigment in ink composition | 10 | 10 | 10 | 10 | 7 |
| Amount of water in ink composition | 52 | 52 | 52 | 52 | 50 |

TABLE 3

| | Ink set | Cyan ink composition | Magenta ink composition | Yellow ink composition | Black ink composition |
|---|---|---|---|---|---|
| Example 1 | Ink set 1 | C | M | Y1 | K |
| Comparative Example 1 | Ink set 2 | C | M | Y2 | K |

Evaluation Methods

Evaluation 1: Evaluation of Color Vividness on Plain Paper

The prepared ink sets were charged into a PX-A550 ink-jet printer (available from Seiko Epson Corporation) altered to change the recording system thereof and were used to print a 100% duty patch pattern including cyan, magenta, yellow, black, red, green, and blue patches. The recording media used for printing were Xerox 4200 and Xerox P paper. The resultant samples were left standing for one hour in a normal environment. After the samples were left standing, the ODs of the patches were measured using a Gretag densitometer (available from Gretag Macbeth AG), and the averages thereof were evaluated on the basis of the following criteria:

AA: OD of 1.35 or more

A: OD of 1.25 to less than 1.35

B: OD of 1.15 to less than 1.25

C: OD of less than 1.15

The results are shown in Table 4 below.

Evaluation 2: Evaluation of Color Vividness on Ink-Jet Paper

As in Evaluation 1, printing was performed using Premium Glossy Photo Paper and Glossy Photo Paper (available from Seiko Epson Corporation) as recording media, the ODs of the 5 patches were measured, and the averages thereof were evaluated on the basis of the following criteria:
- A: OD of 2.0 or more
- B: OD of 1.8 to less than 2.0
- C: OD of less than 1.8

The results are shown in Table 4 below.

Evaluation 3: Evaluation of Color Reproduction

The prepared ink sets were used to print a dedicated output pattern including 400 patches using an ink-jet printer similar to that used in Evaluation 1. All patches on the printouts were subjected to colorimetry, and the volumes thereof in the three-dimensional L*a*b* color space were calculated using a computing tool. The calculated gamut volumes are dimensionless. The color reproduction was evaluated from the calculated gamut volumes on the basis of the following criteria:
- A: 240,000 or more
- B: 200,000 to less than 240,000
- C: less than 200,000

The results are shown in Table 4 below.

Evaluation 4: Evaluation of Ejection Stability

The prepared ink sets were charged into a PX-A550 ink-jet printer as in Evaluation 1 and were used to continuously print a pattern including solid portions and ruled lines at 40° C. During the printing, the recovery (cleaning) function of the recording apparatus was executed each time upon finding a print irregularity due to ejection failure of nozzles or ink deflection. The number of cleaning operations required until 100 consecutive copies were produced was counted, and the results were evaluated on the basis of the following criteria:
- A: No cleaning operation was required.
- B: Less than three cleaning operations were required.
- C: Three or more cleaning operations were required.

The results are shown in Table 4 below.

Evaluation 5: Evaluation of Declogging Performance

The prepared ink sets were charged into an ink-jet printer as in Evaluation 1. After it was determined that all nozzles ejected the ink compositions, the printer was left standing at 40° C. for one week with the ink cartridges detached (with the head positioned out of the home position (with the head displaced from the cap of the printer, that is, uncapped). After the printer was left standing, the number of cleaning operations required until all nozzles ejected the ink compositions to produce a printout in a condition equivalent to the initial condition was counted, and the results were evaluated on the basis of the following criteria:
- A: A printout in a condition equivalent to the initial condition was produced after three or less cleaning operations.
- B: A printout in a condition equivalent to the initial condition was produced after four to nine cleaning operations.
- C: A printout in a condition equivalent to the initial condition was not produced even after ten or more cleaning operations.

The results are shown in Table 4 below.

TABLE 4

|  | Color vividness on plain paper | Color vividness on ink-jet paper | Color reproduction | Ejection stability | Declogging performance |
|---|---|---|---|---|---|
| Example 1 | A | A | A | A | A |
| Comparative Example 1 | AA | C | A | A | A |

EXAMPLE B

Preparation of Resin Emulsion

First, 900 g of ion exchange water and 1 g of sodium lauryl sulfate were put into a reaction vessel equipped with a stirrer, a reflux condenser, a dropping device, and a thermometer and were heated to 70° with stirring while being purged with nitrogen. While the interior temperature was maintained at 70° C., 4 g of potassium persulfate was added as a polymerization initiator and was dissolved. Then, an emulsion prepared in advance by adding 20 g of acrylamide, 365 g of styrene, 545 g of butyl acrylate, and 30 g of methacrylic acid to 450 g of ion exchange water and 3 g of sodium lauryl sulfate with stirring was continuously added to the reaction solution dropwise for four hours. After the dropwise addition, the emulsion was allowed to mature for three hours. After the resultant resin emulsion was cooled to room temperature, ion exchange water and an aqueous sodium hydroxide solution were added to adjust the solid content to 40% by mass and the pH to 8. The resin particles in the resultant aqueous emulsion had a glass transition temperature of −6° C.

Preparation of Ink Compositions

Ink compositions were prepared by mixing the individual components according to the compositions in Table 5 below and filtering the mixtures through a 10 μm membrane filter. The cyan pigment dispersion, the magenta pigment dispersion, the yellow pigment dispersions 1 and 2, and the black pigment dispersion used were those prepared in Example A above. In Table 5 below, the values indicate the contents (% by mass) of the individual components in the inks. The resultant ink compositions were combined as in Table 6 below to configure ink sets 1 to 3.

TABLE 5

|  | Cyan ink composition | | Magenta ink composition | | Yellow ink composition | | | Black ink composition | |
|---|---|---|---|---|---|---|---|---|---|
|  | C1 | C2 | M1 | M2 | Y1 | Y2 | Y3 | K1 | K2 |
| Cyan pigment dispersion (self-dispersible pigment; solid content: 20%) | 50 | 50 |  |  |  |  |  |  |  |
| Magenta pigment dispersion (self-dispersible pigment; solid content: 20%) |  |  | 50 | 50 |  |  |  |  |  |

TABLE 5-continued

| | Cyan ink composition | | Magenta ink composition | | Yellow ink composition | | | Black ink composition | |
|---|---|---|---|---|---|---|---|---|---|
| | C1 | C2 | M1 | M2 | Y1 | Y2 | Y3 | K1 | K2 |
| Yellow pigment dispersion 1 (pigment coated with water-insoluble polymer; solid content: 20%) | | | | | 50 | | 50 | | |
| Yellow pigment dispersion 2 (self-dispersible pigment; solid content: 20%) | | | | | | 50 | | | |
| Black pigment dispersion (self-dispersible pigment; solid content: 20%) | | | | | | | | 35 | 35 |
| Resin emulsion (resin solid content: 40%) | 7.5 | | 7.5 | | 5 | 7.5 | | 7.5 | |
| Glycerol | 8 | 8 | 8 | 8 | 8 | 8 | 8 | 8 | 8 |
| Triethylene glycol | 5 | 5 | 5 | 5 | 5 | 5 | 5 | 5 | 5 |
| 1,2-Hexandiol | 5 | 5 | 5 | 5 | 5 | 5 | 5 | 5 | 5 |
| Trimethylolpropane | 3 | 3 | 3 | 3 | 3 | 3 | 3 | 3 | 3 |
| Triethylene glycol monobutyl ether | 10 | 15 | 10 | 15 | 12 | 10 | 15 | 15 | 18 |
| Olfine E1010 | 0.5 | 0.5 | 0.5 | 0.5 | 0.5 | 0.5 | 0.5 | 0.5 | 0.5 |
| Surfynol 104 | 0.5 | 0.5 | 0.5 | 0.5 | 0.5 | 0.5 | 0.5 | 0.5 | 0.5 |
| Triethanolamine | 1 | 1 | 1 | 1 | 1 | 1 | 1 | 1 | 1 |
| Water | Balance | Balance | Balance | Balance | Balance | Balance | Balance | Balance | Balance |
| Total | 100 | 100 | 100 | 100 | 100 | 100 | 100 | 100 | 100 |
| Amount of pigment in ink composition | 10 | 10 | 10 | 10 | 10 | 10 | 10 | 7 | 7 |
| Amount of water in ink composition | 54 | 52 | 54 | 52 | 53 | 54 | 52 | 52 | 52 |

TABLE 6

| | Ink set | Cyan ink composition | Magenta ink composition | Yellow ink composition | Black ink composition |
|---|---|---|---|---|---|
| Example 1 | Ink set 1 | C1 | M1 | Y1 | K1 |
| Comparative Example 1 | Ink set 2 | C1 | M1 | Y2 | K1 |
| Comparative Example 2 | Ink set 3 | C2 | M2 | Y3 | K2 |

Evaluation Methods

Evaluation 1: Evaluation of Color Vividness on Plain Paper

The prepared ink sets were charged into a PX-A550 ink-jet printer (available from Seiko Epson Corporation) altered to change the recording system thereof and were used to print a 100% duty patch pattern including cyan, magenta, yellow, black, red, green, and blue patches. The recording media used for printing were Xerox 4200 and Xerox P paper. The resultant samples were left standing for one hour in a normal environment. After the samples were left standing, the ODs of the patches were measured using a Gretag densitometer (available from Gretag Macbeth AG), and the averages thereof were evaluated on the basis of the following criteria:

AA: OD of 1.35 or more
A: OD of 1.25 to less than 1.35
B: OD of 1.15 to less than 1.25
C: OD of less than 1.15

The results are shown in Table 7 below.

Evaluation 2: Evaluation of Fusibility on Plain Paper

As in Evaluation 1, a pattern including solid portions and characters was printed. After the printouts were naturally dried for 24 hours, the printed characters were rubbed with a ZEBRA PEN2 (trademark) yellow water-based highlighter available from Zebra Co., Ltd. at a writing pressure of 300 g per 15 mm$^2$, and the pen tip was visually checked for soiling. The results were evaluated on the basis of the following criteria:

A: The pen tip was not soiled after rubbing the same portion twice.
B: The pen tip was not soiled after rubbing once, but was soiled after rubbing twice.
C: The pen tip was soiled after rubbing once.

The results are shown in Table 7 below.

Evaluation 3: Evaluation of Color Vividness on Ink-Jet Paper

As in Evaluation 1, printing was performed using Premium Glossy Photo Paper and Glossy Photo Paper (available from Seiko Epson Corporation) as recording media, the ODs of the patches were measured, and the averages thereof were evaluated on the basis of the following criteria:

A: OD of 2.0 or more
B: OD of 1.8 to less than 2.0
C: OD of less than 1.8

The results are shown in Table 7 below.

Evaluation 4: Evaluation of Smear Resistance on Ink-Jet Paper

One hour after printing was performed as in Evaluation 3, the prints were gently rubbed with a finger and were visually checked for a change in the gloss of the printed surface, and the results were evaluated on the basis of the following criteria:

A: No trace of rubbing was found, and the gloss did not change.
B: A trace of rubbing was found, but the gloss hardly changed.
C: A clear trace of rubbing was found, and the gloss changed.

The results are shown in Table 7 below.

Evaluation 5: Evaluation of Color Reproduction

The prepared ink sets were used to print a dedicated output pattern including 400 patches using an ink-jet printer similar to that used in Evaluation 1. All patches on the printouts were subjected to colorimetry, and the volumes thereof in the three-dimensional L*a*b* color space were calculated using a computing tool. The calculated gamut volumes are dimensionless. The color reproduction was evaluated from the calculated gamut volumes on the basis of the following criteria:

A: 240,000 or more
B: 200,000 to less than 240,000
C: less than 200,000

The results are shown in Table 7 below.

Evaluation 6: Evaluation of Ejection Stability

The prepared ink sets were charged into a PX-A550 ink-jet printer as in Evaluation 1 and were used to continuously print a pattern including solid portions and ruled lines at 40° C. During the printing, the recovery (cleaning) function of the recording apparatus was executed each time upon finding a print irregularity due to ejection failure of nozzles or ink deflection. The number of cleaning operations required until 100 consecutive copies were produced was counted, and the results were evaluated on the basis of the following criteria:

A: No cleaning operation was required.
B: Less than three cleaning operations were required.
C: Three or more cleaning operations were required.

The results are shown in Table 7 below.

Evaluation 7: Evaluation of Declogging Performance

The prepared ink sets were charged into an ink-jet printer as in Evaluation 1. After it was determined that all nozzles ejected the ink compositions, the printer was left standing at 40° C. for one week with the ink cartridges detached and the head positioned out of the home position (with the head displaced from the cap of the printer, that is, uncapped). After the printer was left standing, the number of cleaning operations required until all nozzles ejected the ink compositions to produce a printout in a condition equivalent to the initial condition was counted, and the results were evaluated on the basis of the following criteria:

A: A printout in a condition equivalent to the initial condition was produced after three or less cleaning operations.
B: A printout in a condition equivalent to the initial condition was produced after four to nine cleaning operations.
C: A printout in a condition equivalent to the initial condition was not produced even after ten or more cleaning operations.

The results are shown in Table 7 below.

TABLE 7

|  | Color vividness on plain paper | Fusibility on plain paper | Color vividness on ink-jet paper | Smear resistance on ink-jet paper | Color reproduction | Ejection stability | Declogging performance |
| --- | --- | --- | --- | --- | --- | --- | --- |
| Example 1 | A | A | A | A | A | A | A |
| Comparative Example 1 | AA | A | C | A | A | A | A |
| Comparative Example 2 | A | C | A | B | A | A | A |

What is claimed is:

1. An ink set comprising at least:
   a black ink composition containing a self-dispersible pigment;
   a cyan ink composition containing a self-dispersible pigment;
   a magenta ink composition containing a self-dispersible pigment; and
   a yellow ink composition containing a pigment coated with a water-insoluble polymer.

2. The ink set according to claim 1, wherein each of the ink compositions further contains a resin emulsion.

3. The ink set according to claim 2, wherein the amount of resin emulsion contained in each of the ink compositions is 2% by mass or more.

4. The ink set according to claim 1, wherein the amount of pigment contained in each of the ink compositions is 6% by mass or more.

5. The ink set according to claim 4, wherein each of the ink compositions contains water in an amount of 10% to 60% by mass of the ink composition, a water-soluble organic solvent, and a surfactant.

6. The ink set according to claim 5, wherein each of the ink compositions contains, as the water-soluble organic solvent, a polyalcohol monoalkyl ether and/or a nitrogen-containing cyclic compound in an amount of 5% by mass or more and a polyalcohol.

7. The ink set according to claim 5, wherein the surfactant is an acetylene glycol surfactant and/or a polyether-modified siloxane surfactant.

8. An ink-jet recording method comprising ejecting droplets of the ink compositions of the ink set according to claim 1 onto a recording medium.

* * * * *